United States Patent [19]

Kaga et al.

[11] Patent Number: 4,872,364
[45] Date of Patent: Oct. 10, 1989

[54] STEERING WHEEL

[75] Inventors: Koichi Kaga; Akio Hosoi, both of Aichi; Takao Yamaguchi, Nagoya, all of Japan

[73] Assignee: Toyoda Gosei Co., Ltd., Nishikasugai, Japan

[21] Appl. No.: 246,640

[22] Filed: Sep. 20, 1988

[30] Foreign Application Priority Data

Oct. 27, 1987 [JP] Japan .......................... 62-164326[U]
Oct. 31, 1987 [JP] Japan .......................... 62-167169[U]
Oct. 31, 1987 [JP] Japan .......................... 62-167170[U]

[51] Int. Cl.$^4$ .......................... B62D 1/04; H01H 9/02
[52] U.S. Cl. .......................... 74/484 H; 200/61.55
[58] Field of Search .......................... 74/484 H, 552; 200/61.55, 61.56; 439/15

[56] References Cited

U.S. PATENT DOCUMENTS

| | | | |
|---|---|---|---|
| 2,061,222 | 11/1936 | Creson | 200/61.55 |
| 3,712,968 | 1/1973 | Bonn et al. | 200/61.56 |
| 4,590,340 | 5/1986 | Koike et al. | 200/61.55 X |
| 4,594,486 | 6/1986 | Noda | 200/61.55 X |
| 4,612,425 | 9/1986 | Kanai et al. | 200/61.55 |
| 4,655,101 | 4/1987 | Endo et al. | 200/61.55 X |
| 4,714,806 | 12/1987 | Inui et al. | 200/61.55 |
| 4,789,763 | 12/1988 | Nagata et al. | 200/61.55 X |
| 4,808,776 | 2/1989 | Niwa et al. | 200/61.55 |

FOREIGN PATENT DOCUMENTS 60-182256 12/1985 Japan .

Primary Examiner—Allan D. Herrmann
Attorney, Agent, or Firm—Cushman, Darby & Cushman

[57] ABSTRACT

A steering wheel includes a steering wheel body and a horn pad disposed above a boss section and held by the steering wheel body. The back side of the horn pad is provided with a plurality of hook legs, and the steering wheel body is provided with a plurality of latch portions corresponding to the hook legs. Disposed between the horn pad and the steering wheel body are a spring for urging the horn pad upward and a horn switch unit for actuating a horn in depressing a horn pad. A control portion for actuating the horn switch unit upon depression of the horn pad is arranged in a rear section of the horn pad. Laterally provided in a front section of the horn pad is a center-of-pivot portion which acts as the center of pivot when the horn pad is depressed.

4 Claims, 13 Drawing Sheets

STEERING WHEEL

BACKGROUND OF THE INVENTION

1. Field of the Invention

This invention relates to a vehicle steering wheel and, more particularly, to a steering wheel of the center horn type which actuates a horn upon depression of a horn pad covering above a boss section.

2. Description of the Prior Art

A conventional steering wheel of the center horn type is configured as shown in FIGS. 1 through 3 (see Japanese Utility Model Application Laid-Open No. 60-182256).

In the conventional steering wheel WO, a horn pad 1, which covers above a boss section B and actuates a horn upon depression, has a plurality of hook legs 2 provided at marginal portions on the back side thereof. This horn pad 1 is attached to a steering wheel body 4 by locking these hook legs 2 in latch portions 5 of the steering wheel body 4.

Each hook leg 2 has an enlarged head portion 2b provided at the distal end of a shaft portion 2a thereof, this head portion 2b having a gap 2c formed in the axial direction thereof so that the diameter of the head portion can be reduced.

Each latch portion 5 is substantially cylindrical, whose inner diameter is tapered to define a narrow portion 5a.

The horn pad 1 is assembled to the steering wheel body 4 by inserting each hook leg 2 in the corresponding latch portion 5 such that the upper side of each head portion 2b is locked by the lower side of the corresponding narrow portion 5a.

In the assembled state, the horn pad 1 is urged upward from the steering wheel body 4, because projections 3 provided at marginal portions on the back side of the horn pad 1 are in abutment on corresponding end portions of movable contact plates 6 made of flat springs which are disposed in front and rear marginal portions of the steering wheel WO and laterally extended.

Specifically, each movable contact plate 6, together with a mating stationary contact plate 7 disposed below the plate 6, composes a horn switch unit H with an insulating material 8 interposed therebetween. Each contact plate 6 is connected to the positive side of a horn actuating circuit, whereas each stationary contact plate 7 is connected to the negative side of the horn actuating circuit.

In the foregoing steering wheel WO, when the horn pad 1 is depressed, the projections 3 descend in opposition to the urging force of the movable contact plates 6 so that contact points 6a of the movable contact plates 6 are brought into contact with contact points 7a of the stationary contact plates 7; as a result, the horn is actuated.

According to the conventional steering wheel WO of the center horn type, when a central portion of the horn pad 1 is depressed, the whole horn pad 1 descends substantially uniformly.

However, when the horn pad 1 is depressed at its front/rear or left/right marginal portion, because of the presence of the clearances between the shaft portions 2a and the narrow portions 5a that are incorporated to provide slidability between them, one margin, on the side of a depressed portion, of the horn pad 1 sinks most so that the horn pad 1 takes an oblique position. Accordingly, the circumference of the horn pad 1 tends to interfere with a lower cover 9 surrounding the horn pad 1 or with a coating layer 10 of a spoke section S on the side of the steering wheel body 4 (such interference will not occur when the whole horn pad 1 descends substantially uniformly).

To avoid the interference of the horn pad 1 with the surrounding components at the time of depression, the conventional steering wheel WO of the center horn type is required to involve a comparatively wide clearance between the horn pad 1 and the surrounding steering wheel body 4, this causing a degradation of the appearance of the steering wheel WO.

SUMMARY OF THE INVENTION

It is the object of the present invention to provide a steering wheel which allows the clearance between a horn pad and a surrounding steering wheel body to be lessened as far as possible and its appearance to be improved.

The foregoing object is achieved by a steering wheel which comprises a steering wheel body, a horn pad disposed and held above a boss section of the steering wheel body, a plurality of hook legs provided on the back side of the horn pad, a plurality of latch portions provided on the steering wheel body correspondingly to the hook legs, an urging means disposed between the horn pad and the steering wheel body for urging the horn pad upward, a horn switch unit disposed between the horn pad and the steering wheel body for actuating a horn when the horn pad is depressed, a control portion arranged in a rear section of the horn pad when the horn pad is depressed, and a center-of-pivot portion laterally provided in a front section of the horn pad which acts as the center of pivot when the horn pad is depressed.

As will be appreciated, in the steering wheel according to the present invention, the rear section of the horn pad which is very adapted for depression includes the control portion, whereas the front section of the horn pad includes the center-of-pivot portion laterally provided therein. Accordingly, upon depression the horn pad always inclines longitudinally or in the longitudinal direction of the steering wheel; thus, it is possible to determine the clearance between the horn pad and the surrounding steering wheel body only by taking a given longitudinal inclination of the horn pad into consideration, thus to remarkably lessen the spacing between them, whereby the appearance of the steering wheel can be improved.

DISCRIPTION OF THE REFERRED EMBODIMENTS

Figure 1:
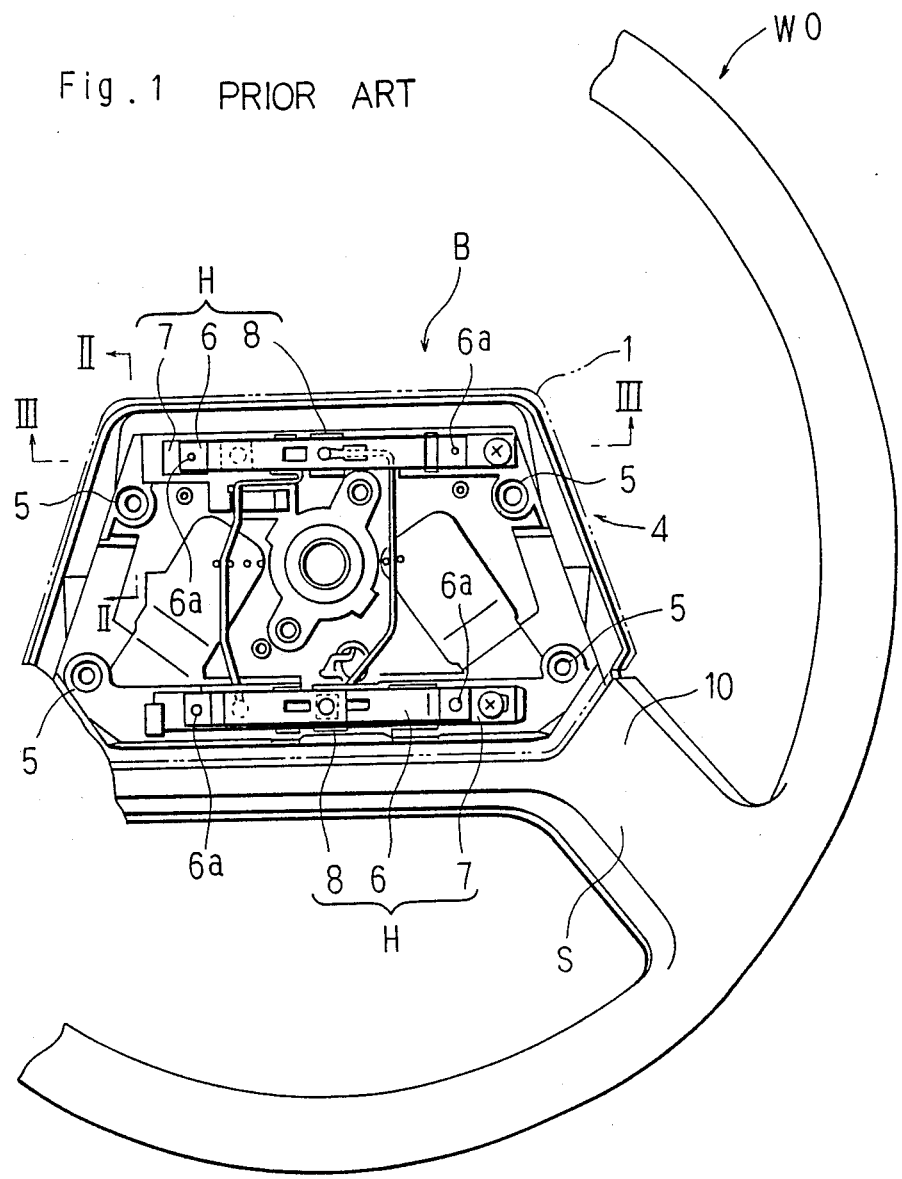
FIG. 1 is a plan view showing a conventional steering wheel.
Figure 2:
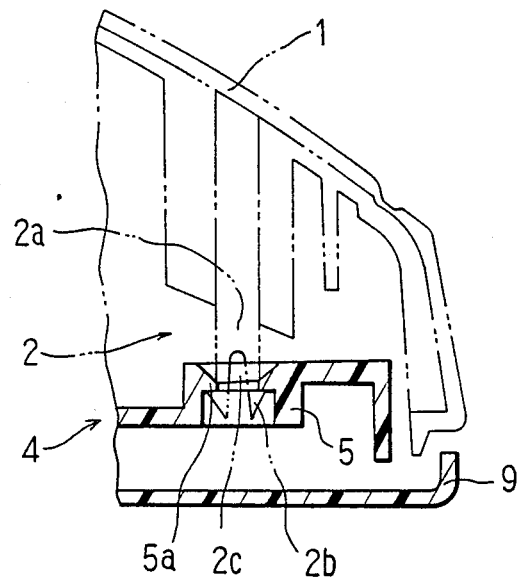
FIG. 2 is a sectional view taken along line II-II in FIG. 1.
Figure 3:
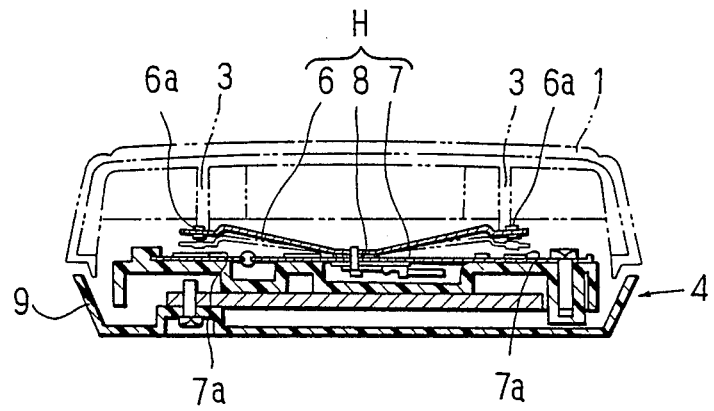
FIG. 3 is a sectional view taken along line III-III in FIG. 1.

Embodiments of the present invention will now be described with reference to the drawings.

A steering wheel W1 according to a first embodiment shown in FIGS. 4 through 9 is of the center horn type in which a horn pad 11 covers above a boss section B of a steering wheel body 14. A predetermined portion of the peripheral surface of a boss plate 17 is coated with a coating layer 18 made of hard synthetic resin, such as PP (polypropylene), which is molded integrally with a coating layer of a ring section (not shown), a coating layer 20 of a spoke section S and the like.

The coating layer 18 is extended upward so as to surround the horn pad 11, and latch portions 15, 25 are formed at four predetermined positions which are adapted to lock hook legs 12, 22 hereinafter described.

The horn pad 11 includes an insert 11b made of hard synthetic resin, such as ABS, PP, or PA (polyamide), which is coated with a coating layer 11a made of soft synthetic resin, such as soft urethane or PVC (Polyvinyl Chloride). Provided on the back side of the horn pad 11 are two front hook legs 12 and two rear hook legs 22, which are molded integrally with the insert 11b and located, respectively, near to the front and rear margins of the steering wheel W1 (see FIGS. 4, 5, 8 and 9).

The two front hook legs 12, as well as the two rear hook legs 22, are laterally spaced from each other. Each front hook leg 12 has a laterally enlarged head protion 12b provided at the distal end of a shaft portion 12a thereof, this head portion 12b being laterally divided into two by gap 12c formed therein so that its diameter can be reduced. Similarly, each rear hook leg 22 has a longitudinally enlarged head portion 22b provided at the distal end of a shaft portion 22a thereof, this head portion 22b being longitudinally divided into two by a gap 22c formed therein so that its diameter can be reduced.

As described above, on the side of the steering wheel body 14, the coating layer 18 enclosing the boss plate 17 has four latch portions 15, 25 provided thereon which correspond to the front hook legs 12 and the rear hook legs 22. Specifically, there are two front latch portions 15 and two rear latch portions 25, with the two portions of each pair being laterally spaced from each other. Each of the front latch portions 15 and of the rear latch portions 25 is substantially cylindrical, whose inner diameter is tapered to define a narrow portion 15a, 25a so that the upper side of the head portion 12b, 22b of each hook leg 12, 22 can be locked by the lower side of the corresponding narrow portion 15a, 25a.

The shaft portion 12a of each front hook leg 12 of the horn pad 11 is provided on its peripheral surface with ribs 12d, 12d which abut on the upper end surface, at the center, of the corresponding latch portion 15 when the front hook leg 12 is inserted in the front latch portion 15 and the upper side of the head portion 12b is locked by the lower side of the narrow portion 15a. The contact area of each rib 12d with the upper end surface of the corresponding front latch portion 15 serves as the center of pivot 0 when the horn pad 11 is depressed to actuate a horn, or the point of support about which the horn pad 11 can incline; therefore, the lower end of each rib is made arcuate.

The back side of the horn pad 11 has projections 13 located at intermediate positions between the front hook legs 12 and the rear hook legs 22, which projections are laterally spaced from each other and adapted to actuate a horn switch unit H, hereinafter described, disposed between the horn pad 11 and the steering wheel body 14 (see FIGS. 4 and 8).

Reference symbol 11c designates reinforcing ribs for the pad 11; 12e, 22e reinforcing ribs for the hook legs 12, 22 which extend from the ribs 11c; and 13a reinforcing ribs for the projections 13 which extend from the ribs 11c. 15b, 25b are reinforcing ribs for the latch portions 15, 25.

The horn switch unit H is composed of a substantially C-shaped movable contact plate 16 being secured to the coating layer 18 of the steering wheel body 14 by a screw 26, the boss plate 17, and an insulating material. In this embodiment, the coating layer 18 serves as this insulating material (see FIGS. 4, 7 and 8).

The movable contact plate 16 is made of a flat spring, which serves also as an urging means for urging the horn pad 11 upward as in the conventional steering wheel W0. Both ends of the movable contact plate are located above portions of the boss plate 17 exposed from the coating layer 18, each end having a contact point 16a. Each projection 13 of the horn pad 11 is held in abutment on the corresponding end upper surface of the movable contact plate 16.

Figure 7:
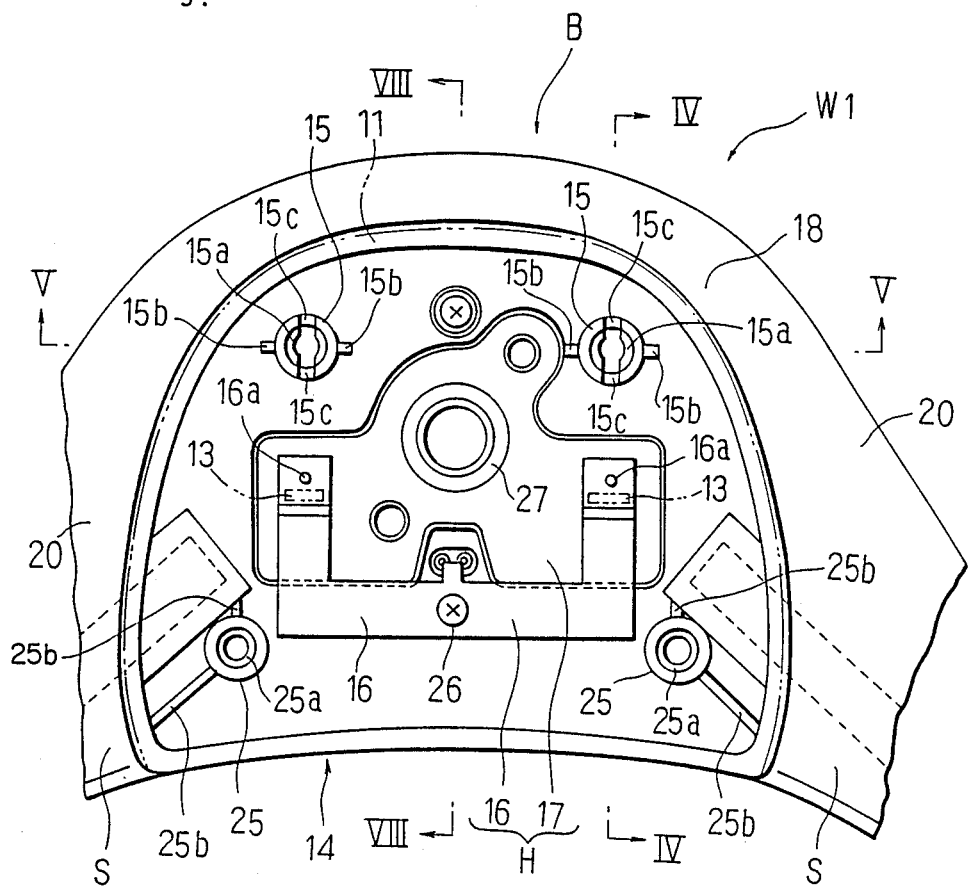
FIG. 7 is a plan view showing the steering wheel according to the first embodiment with a horn pad removed.
Figure 8:
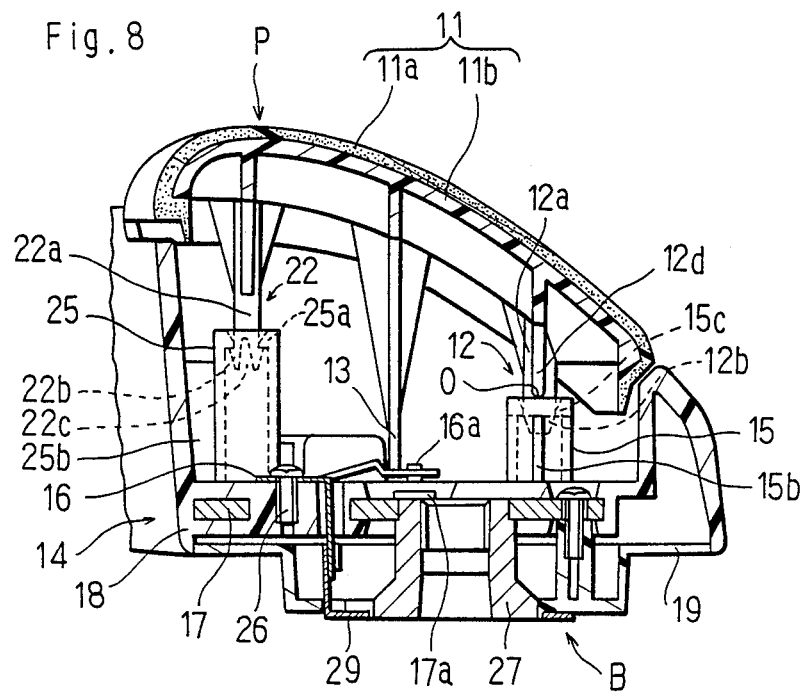
FIG. 8 is a sectional view showing the steering wheel according to the first embodiment, which is taken along line VIII-VIII in FIG. 7.

As shown in FIGS. 7 and 8, the movable contact plate 16 is connected to a slip ring 29 provided on the under surface of the lower cover 19.

After the steering wheel W1 is assembled in a vehicle, the slip ring 29 is connected through a brush or the like on the side of a column not shown to the positive side of a horn actuating circuit, whereas the boss plate 17 is connected through a boss 27 and a steering shaft not shown to the negative side of the horn actuating circuit.

The symbol 17a designates contact points of the boss plate 17 corresponding to the contact points 16a of the movable contact plate 16.

In assembling the horn pad 11 in the steering wheel body 14, the front hook legs 12 and the rear hook legs 22 are inserted in the front latch portions 15 and the rear latch portions 25, respectively. After the steering wheel W1 is mounted in the vehicle, a rear portion P of the horn pad 11 as a control portion is depressed to actuate the horn (see FIG. 4). Specifically, the depression of this rear portion P is transmitted through the projections 13 to the horn switch unit H.

Upon depression, the horn pad 11 inclines longitudinally, in opposition to the urging force of the movable contact plate 16, about the center of pivot 0 or the contact area of each pivotal rib 12d of each front hook leg 12 with the upper end surface of the corresponding front latch portion 15, so that the contact points 16a of the movable contact plate 16 are brought into contact with the contact points 17a of the boss plate 17 by means of the projections 13, whereby the horn is actuated.

As described above, the front hook legs 12 of the horn pad 11 are laterally spaced from each other, each head portion 12b is laterally enlarged, and each pivotal rib 12d of each shaft portion 12a is shaped so as to abut laterally on the upper end surface, at the center, of the corresponding front latch portion 15 when the pad 11 is assembled.

Therefore, the horn pad 11 is prevented from inclining laterally and a front portion of the pad 11 is prevented from descending, because each pivotal rib 12d is in lateral abutment on the upper end surface of the corresponding front latch portion 15. That is, as far as a point within the rear control portion P of the horn pad 11 is depressed, the pad inclines only longitudinally about the center of pivot 0 or the contact area of the rib 12d with the upper end surface of the front latch portion 15. Of course, the longitudinal inclination of the horn pad 11 is not hindered because the head portion 12b of the front hook leg 12 is enlarged only laterally.

As described above, in the steering wheel W1 according to the first embodiment, the clearance between the horn pad 11 and the steering wheel body 14 including the surrounding lower cover 19, coating layer 18 and the like is easily determined in design while paying attention only to the longitudinal inclination of the horn pad 11, not to its lateral inclination; thus, the spacing between them can be remarkably lessened as compared with the conventional steering wheel W0 and the appearance of the steering wheel can be enhanced correspondingly.

Further, the steering wheel W1 according to the first embodiment can operate with only one horn switch unit H, or only one set of contacts, in contrast with the conventional steering wheel W0; thus, the number of parts can be decreased and the number of assembling steps can be reduced.

Figure 4:
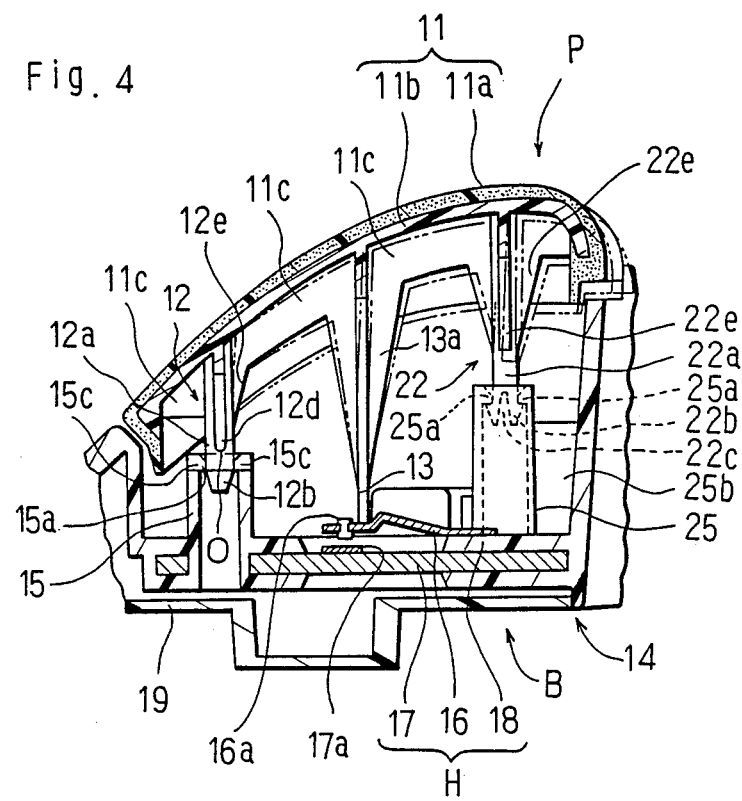
FIG. 4 is a sectional view showing a steering wheel according to a first embodiment of the present invention, which is taken along line IV-IV in FIG. 7.
Figure 5:
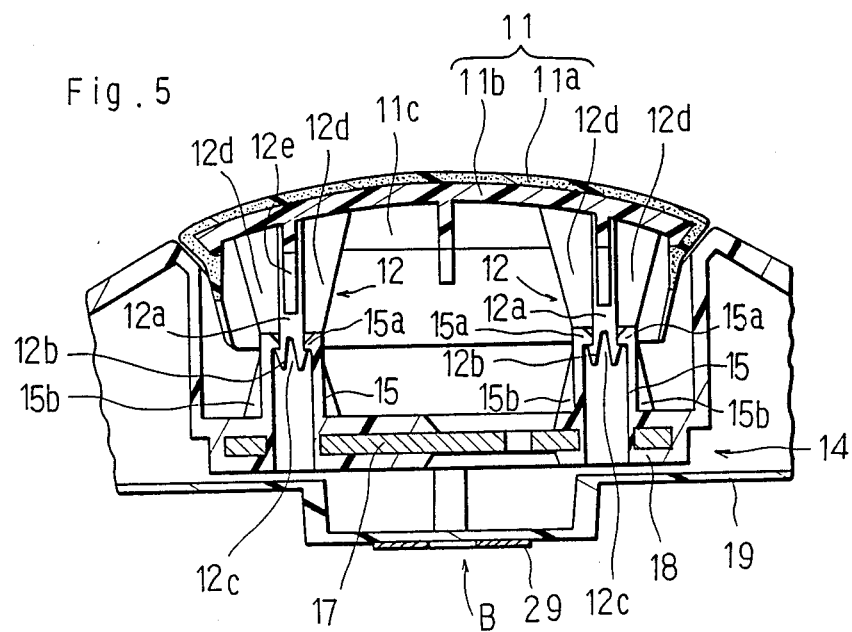
FIG. 5 is a sectional view showing the steering wheel according to the first embodiment, which is taken along line V-V in FIG. 7.
Figure 6:
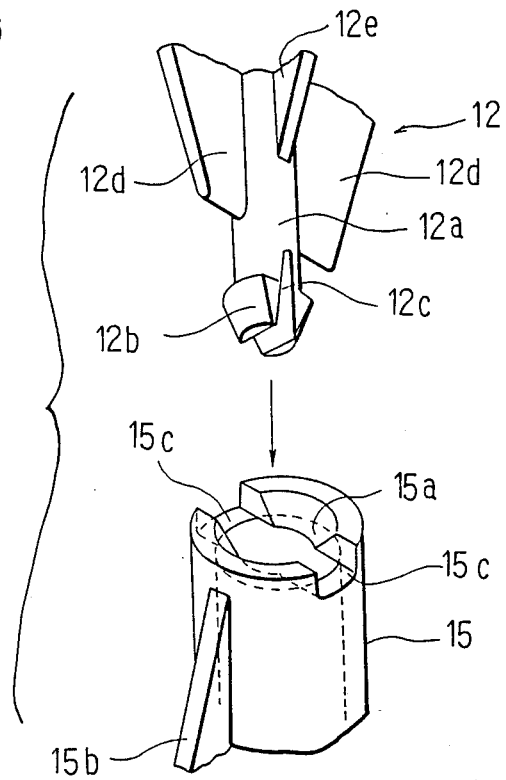
FIG. 6 is an exploded perspective view showing a front hook leg and a front latch portion according to the first embodiment.

Further, in the steering wheel W1 according to the first embodiment, as shown in FIGS. 4, 6 and 7, the upper end surface of each front latch portion 15 of the steering wheel body 14 has a groove 15c formed longitudinally at the center thereof. The head portion 12b of each front hook leg 12 slightly inclines longitudinally inside the latch portion 15 when the horn pad 11 is depressed. In this connection, the groove 15c is provided to facilitate smooth inclination of the head portion. However, if the longitudinal width of the enlarged head portion 12b is reduced, or if the inner diameter of the narrow portion 15a of each front latch portion 15 is slightly increased, the foregoing smooth inclination is allowed by such provisions because the extent of inclination of the head portion 12b is very small.

Figure 9:
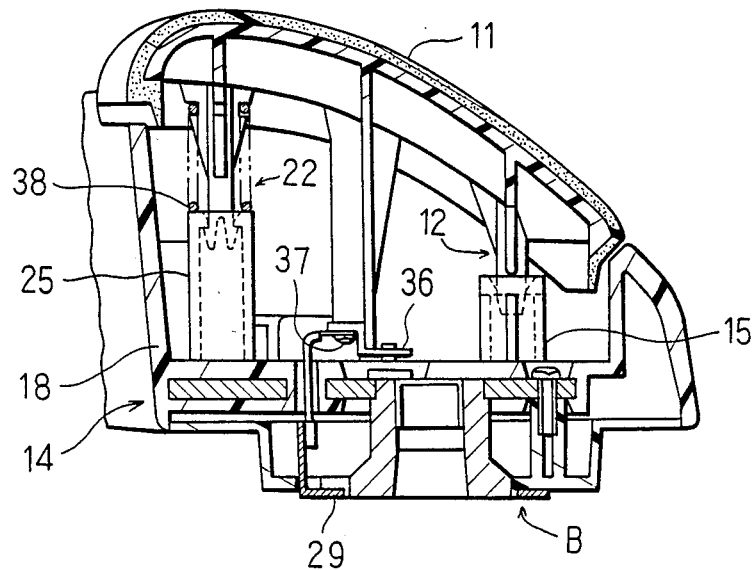
FIG. 9 is a sectional view showing a modification of the steering wheel according to the first embodiment.

Further, the steering wheel W1 according to the first embodiment includes the movable contact plate 16 in the horn switch unit H, which is made of a flat spring and serves also as the urging means. However, as shown in FIG. 9, where a movable contact plate 36 is secured to the pad 11 by a screw 37 or the like, the urging means in the form of a coil spring 38 may be interposed between the pad 11 and the steering wheel body 14.

A steering wheel W2 according to a second embodiment shown in FIGS. 10 through 13 is of the center horn type in which the horn pad 11 covers above the boss section B, similarly to the steering wheel W1 according to the first embodiment. A predetermined portion of the peripheral surface of the boss plate 17 is coated with the coating layer 18 made of hard synthetic resin, such as PP, which is molded integrally with the coating layer of the ring section not shown, the coating layer 20 of the spoke section S and the like.

The coating layer 18 is extended upward so as to surround the horn pad 11.

The horn pad 11 includes the insert 11b made of hard synthetic resin, such as ABS or PP, which is coated with the coating layer 11a made of soft synthetic resin, such as soft urethane or PVC. Provided on the back side of the horn pad 11 are two projections 42 located near to the front margin of the steering wheel W2 and molded integrally with the insert 11b, and the two hook legs 22 located near to the rear margin and molded integrally with the insert 11b (see FIGS. 10, 12 and 13).

The two projections 42, as well as the two hook legs 22, are laterally spaced from each other. Each projection 42 is provided at its distal end with a band-shaped spring piece 43 which serves as the urging means for urging the horn pad 11 upward when the horn pad 11 is assembled in the steering wheel body 14. This spring piece 43 is fabricated by bending a metallic material having spring resiliency into a substantially L shape in cross section, whose upper portion 43a is secured to the projection 42 by a screw 44.

Similarly to the steering wheel W1 according to the first embodiment, each hook leg 22 has a longitudinally enlarged head portion 22b provided at the distal end of a shaft portion 22a thereof, this head portion 22a being longitudinally divided into two by a gap 22c formed therein so that its diameter can be reduced.

Figure 10:
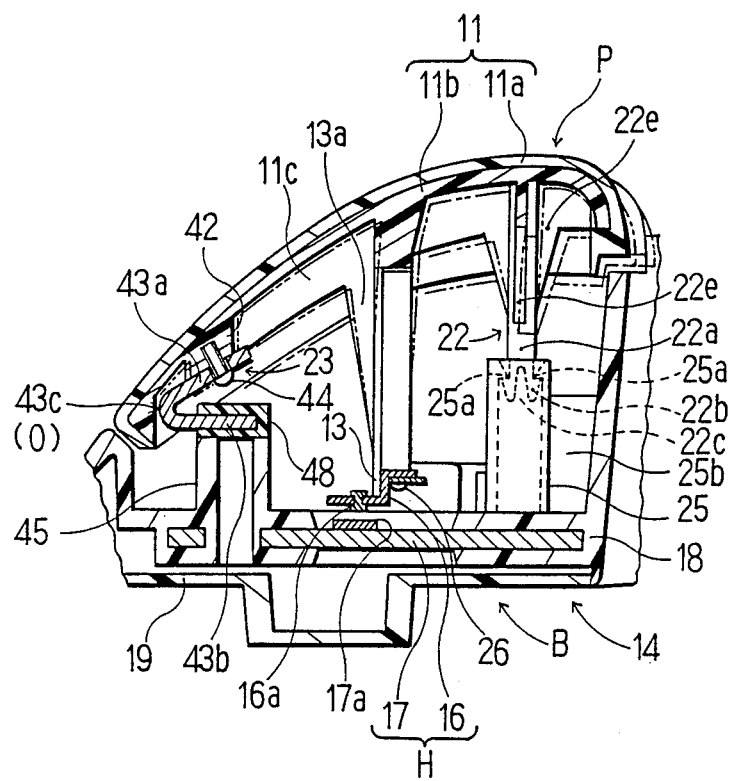
FIG. 10 is a sectional view showing a steering wheel according to a second embodiment of the present invention, which is taken along line X-X in FIG. 11.
Figure 13:
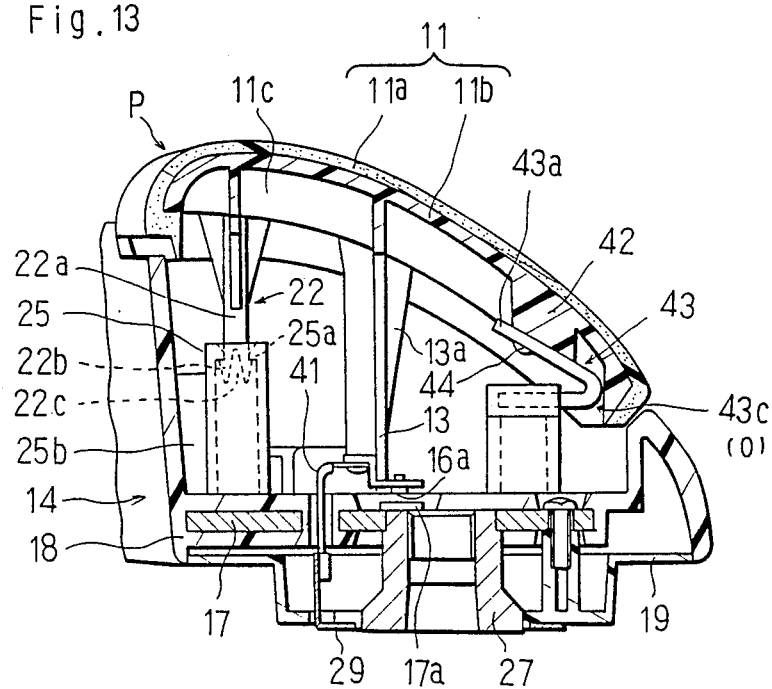
FIG. 13 is a sectional view showing the steering wheel according to the second embodiment, which is taken along line XIII-XIII in FIG. 11.

The back side of the horn pad 11 has the projections 13 located at intermediate positions between the projections 42 and the hook legs 22 and laterally spaced from each other, the projections 13 being adapted to actuate the horn switch unit H disposed between the horn pad 11 and the steering wheel body 14 (see FIGS. 10 and 13).

Similarly to the first embodiment, reference symbol 11c designates reinforcing ribs for the pad 11; 22e reinforcing ribs for the hook legs 22 which extend from the ribs 11c; and 13a reinforcing ribs for the projections 13 which extend from the ribs 11c.

The steering wheel body 14 has two cylindrical portions 45 laterally spaced from each other and provided on the coating layer 18 enclosing the boss plate 17, which correspond to the projections 42. Bonded to the upper end of each cylindrical portion 45 is a holding member 48 having an insertion opening 48a into which the lower end 43b of the spring piece 43 can be inserted from front side. Of course, this holding member may be formed integrally with the coating layer 18.

Further, the two latch portions 25 laterally spaced from each other are provided correspondingly to the hook legs 22. Similarly to the steering wheel W1 according to the first embodiment, each latch portion 25 is integral with the coating layer 18 and substantially cylindrical, whose inner diameter is tapered to define a narrow portion 25a so that the upper side of the head portion 22b of each hook leg 22 can be locked by the lower side of the corresponding narrow portion 25a.

The symbol 25b is reinforcing ribs for the latch portions 25.

Figure 11:
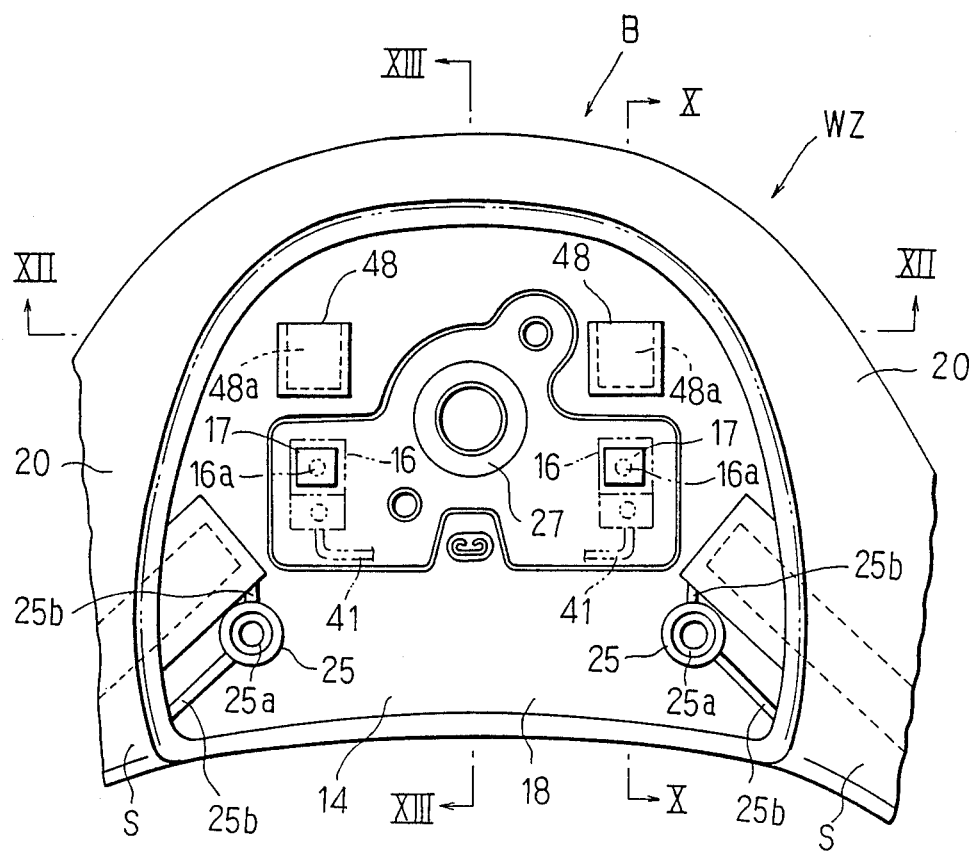
FIG. 11 is a plan view showing the steering wheel according to the second embodiment with a horn pad removed.
Figure 12:
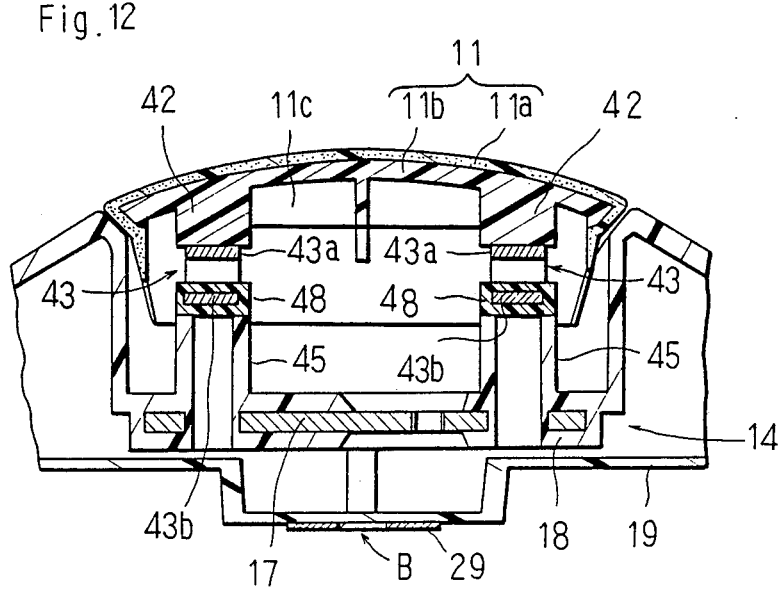
FIG. 12 is a sectional view showing the steering wheel according to the second embodiment, which is taken along line XII-XII in FIG. 11.

The horn switch unit H is composed of a movable contact plate 16 being secured to the distal ends of the two projections 13 of the horn pad 11 by screws 26, and the boss plate 17 (see FIGS. 10, 11 and 13).

The ends of the movable contact plate 16 are located above portions of the boss plate 17 exposed from the coating layer 18, each end having a contact point 16a. The movable contact plate 16 is connected through lead wires 41 to the slip ring 29 provided on the under surface of the lower cover 19, as shown in FIG. 13.

After the steering wheel W2 is assembled in the vehicle, the slip ring 29 is connected through the brush or the like on the side of the column not shown to the positive side of the horn actuating circuit, whereas the boss plate 17 is connected through the boss 27 and the steering shaft not shown to the negative side of the horn actuating circuit.

The symbol 17a designates contact points provided on the boss plate correspondingly to the contact points 16a of the movable contact plate 16.

In assembling the horn pad 11 in the steering wheel body 14, the spring pieces 43 and the hook legs 22 are inserted in the holding members 48 and the latch portions 25, respectively. After the steering wheel W2 is mounted in the vehicle, the rear control portion P of the horn pad 11 is depressed to actuate the horn (see FIG. 10).

Upon depression, the horn pad 11 inclines longitudinally, in opposition to the urging force of the spring pieces 43, about the center of pivot 0 or the bent portion 43c of each spring piece 43, so that the contact points 16a of the movable contact plate 16 are brought into contact with the contact points 17a of the boss plate 17 by means of the projections 13, whereby the horn is actuated.

As described above, the spring pieces 43 attached to the horn pad 11 are laterally spaced from each other, and are adapted to bend only longitudinally with the bent portions 43c being located on the front side of the steering wheel.

Therefore, the horn pad 11 is prevented from inclining laterally, and as far as a point within the rear control portion P of the horn pad 11 is depressed, the pad inclines only longitudinally about the center of pivot 0 or the bent portion 43c of the spring piece 43.

As described above, in the steering wheel W2 according to the second embodiment, the clearance between the horn pad 11 and the steering wheel body 14 including the surrounding lower cover 19, coating layer 18 and the like is easily determined in design while paying attention only to the longitudinal inclination of the horn pad 11, not to its lateral inclination; thus, the spacing between them can be remarkably lessened as compared with the conventional steering wheel W0 and the appearance of the steering wheel can be enhanced correspondingly.

Further, in the steering wheel W2 according to the second embodiment, the spring pieces 43 hold the front portion of the horn pad 11 stationarily and urge the horn pad 11 upward; thus, the number of parts can be decreased as compared with the conventional steering wheel W0 and the number of assembling steps can be reduced.

A steering wheel W3 according to a third embodiment shown in FIGS. 14 through 20 is of the center horn type in which the horn pad 11 covers above the boss section B, similarly to the steering wheel W1 according to the first embodiment. A predetermined portion of the peripheral surface of the boss plate 17 is coated with the coating layer 18 made of hard synthetic resin, such as PP, which is molded integrally with the coating layer of the ring section not shown, the coating layer 20 of the spoke section S and the like.

The coating layer 18 is extended upward so as to surround the horn pad 11.

The horn pad 11 includes the insert 11b made of hard synthetic resin, such as ABS or PP, which is coated with the coating layer 11a made of soft synthetic resin, such as soft urethane or PVC. Provided on the back side of the horn pad 11 are two front hook legs 52 located near to the front margin of the steering wheel W3 and the two rear hook legs 22 located near to the rear margin, all being molded integrally with the insert 11b (see FIGS. 14, 15, 18 and 20).

The two front hook legs 52, as well as the two rear hook legs 22, are laterally spaced from each other. Each front hook leg 52 has a head portion 52b provided at the distal end of a shaft portion 52a thereof, this head portion 52b including a columnar portion extending laterally. Similarly to the first embodiment, each rear hook leg 22 has a longitudinally enlarged head portion 22b provided at the distal end of a shaft portion 22a thereof, this head portion 22b being longitudinally divided into two by a gap 22c formed therein so that its diameter can be reduced.

Figure 14:
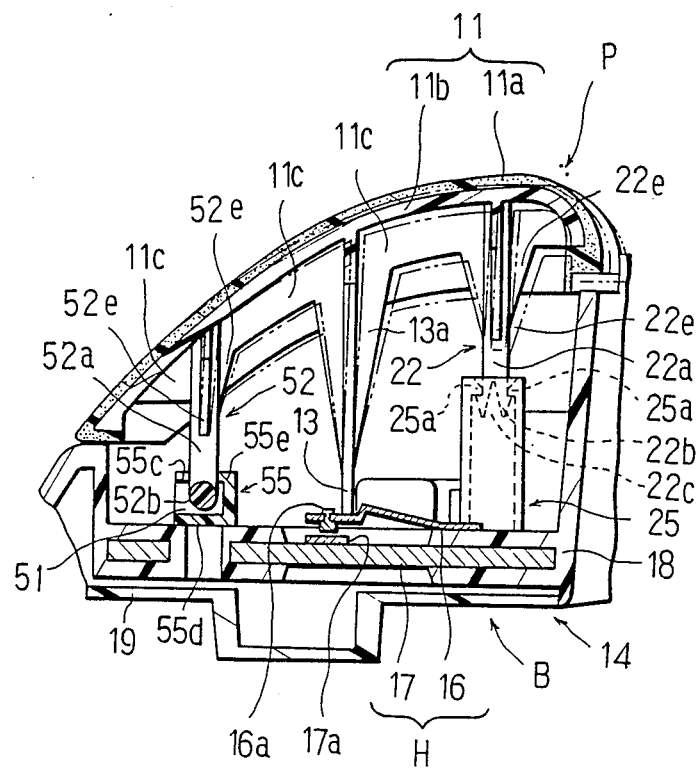
FIG. 14 is a sectional view showing a steering wheel according to a third embodiment of the present invention, which is taken along line XIV-XIV in FIG. 17.
Figure 15:
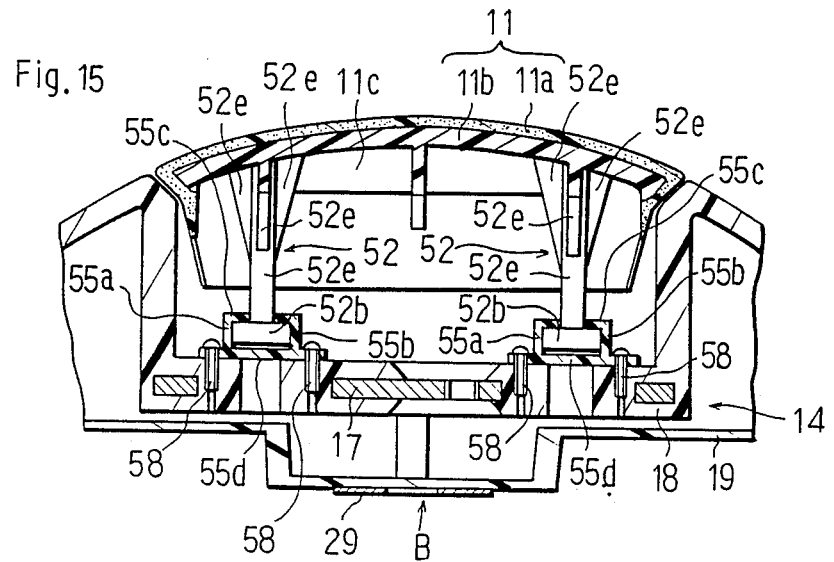
FIG. 15 is a sectional view showing the steering wheel according to the third embodiment, which is taken along line XV-XV in FIG. 17.
Figure 16:
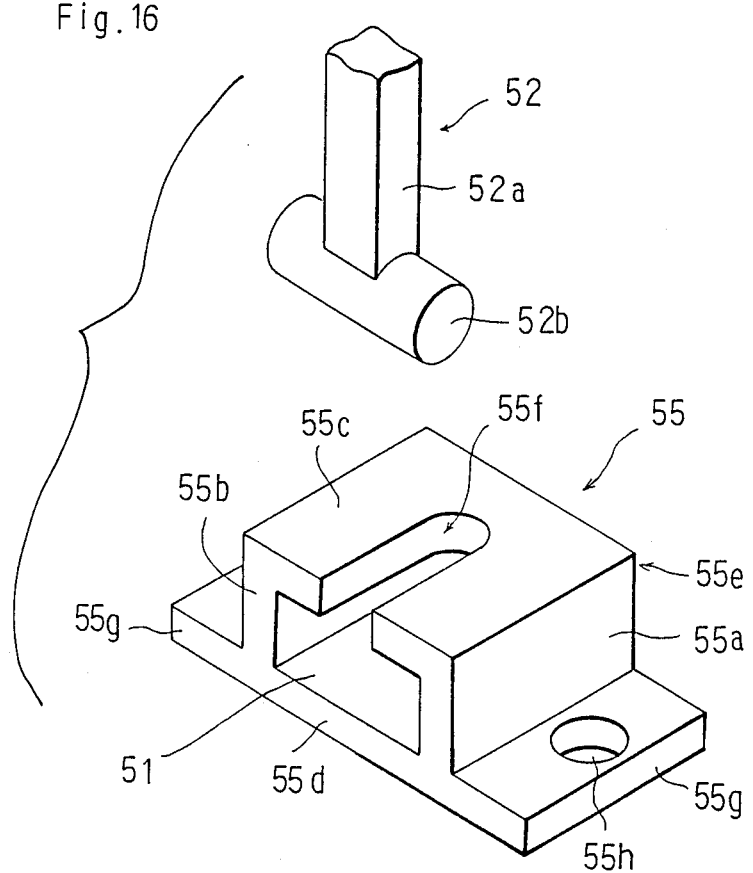
FIG. 16 is an exploded perspective view showing a front hook leg and a front latch portion according to the third embodiment.
Figure 18:
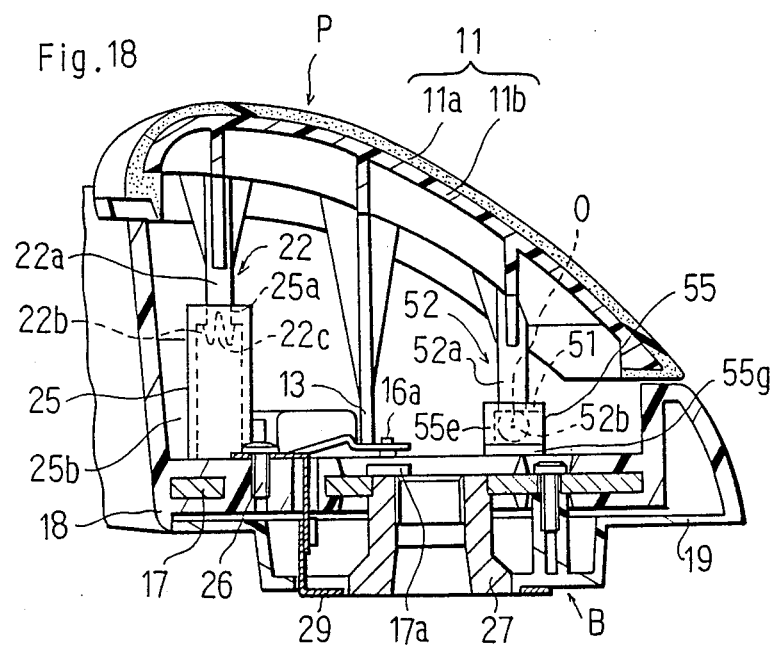
FIG. 18 is a sectional view showing the steering wheel according to the third embodiment, which is taken along line XVIII-XVIII in FIG. 17.

The back side of the horn pad 11 has the projections 13 located at intermediate positions between the front hook legs 52 and the rear hook legs 22 and laterally spaced from each other, these projections 13 being adapted to actuate the horn switch unit H disposed between the horn pad 11 and the steering wheel body 14 (see FIGS. 14 and 18).

Reference symbol 11c designates reinforcing ribs for the pad 11; 52e, 22e reinforcing ribs for the hook legs 52, 22 which extend from the ribs 11c; and 13a reinforcing ribs for the projections 13 which extend from the ribs 11c.

The steering wheel body 14 has two front latch portions 55 and the two rear latch portions 25 which are provided on the coating layer 18 enclosing the boss plate 17 and correspond to the front hook legs 52 and the rear hook legs 22, respectively, with the two portions of each pair being laterally spaced from each other. Specifically, each front latch portion 55 is made up of a left wall portion 55a, a right wall portion 55b, an upper wall portion 55c, a lower wall portion 55d, and a rear wall portion 55e, with the front side thereof left open, thereby giving a box-like shape. The spacing between the upper wall portion 55c and the lower wall portion 55d is substantially identical with the diameter of the head portion 52b of the hook leg 52, which defines a space portion 51. The spacing between the left wall portion 55a and the right wall portion 55b is substantially identical with the longitudinal length of the head portion 52b. The lower wall portion 55d is laterally extended to define flange portions 55g. The upper wall portion 55c is formed at the center with a longitudinally-elongate cutout groove 55f in which the shaft portion 52a of the front hook leg 52 can be inserted from front side. The foregoing front latch portion 55 is secured to the steering wheel body 14 by screws 58 passing through screw holes 55h formed in the flanges 55g. Of course, the front latch portion 55 may be molded integrally with the coating layer 18 enclosing the boss plate 17 or with the lower cover 19.

When the head portion 52b of the front hook leg 52 is fitted in the space portion 51, the upper wall portion 55c restricts the upward movement of the head portion 52b.

Similarly to the first embodiment, each rear latch portion 25 is substantially cylindrical and is molded intergrally with the coating layer 18, whose inner diameter is tapered to define a narrow portion 25a so that the upper side of the head portion 22b of each rear hook leg 22 can be locked by the lower side of the corresponding narrow portion 25a.

The symbol 25b is reinforcing ribs for the latch portions 25.

Figure 17:
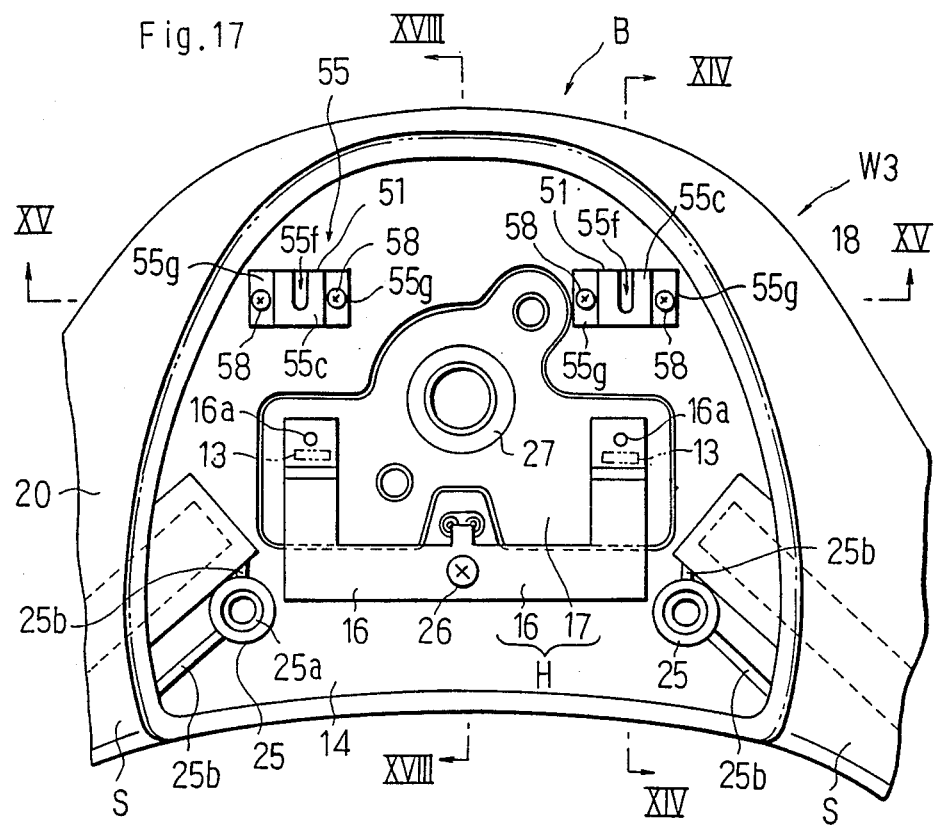
FIG. 17 is a plan view showing the steering wheel according to the third embodiment with a horn pad removed.

The horn switch unit H is composed of a substantially C-shaped movable contact plate 16 being secured to the coating layer 18 of the steering wheel body 14 by a screw 26, the boss plate 17, and an insulating material, with the coating layer 18 serving also as this insulating material (see FIGS. 14, 17 and 18).

The movable contact plate 16 is made of a flat spring, which serves also as the urging means for urging the horn pad 11 upward as in the conventional steering wheel W0. Both ends of the movable contact plate are located above portions of the boss plate 17 exposed from the coating layer 18, each end having a contact point 16a. Each projection 13 of the horn pad 11 is held in abutment on the corresponding end upper surface of the movable contact plate 16.

As shown in FIGS. 17 and 18, the movable contact plate 16 is connected to the slip ring 29 provided on the under surface of the lower cover 19.

After the steering wheel W3 is assembled in the vehicle, the slip ring 29 is connected through the brush or the like on the side of the column not shown to the positive side of the horn actuating circuit, whereas the boss plate 17 is connected through the boss 27 and the steering shaft not shown to the negative side of the horn actuating circuit.

The symbol 17a designates contact points of the boss plate 17 corresponding to the contact points 16a of the movable contact plate 16.

In assembling the horn pad 11 to the steering wheel body 14, the front hook legs 52 and the rear hook legs 22 are inserted in the front latch portions 55 and the rear latch portions 25, respectively. After the steering wheel W3 is mounted in the vehicle, the rear control portion P of the horn pad 11 is depressed to actuate the horn (see FIG. 14).

Upon depression, the horn pad 11 inclines longitudinally, in opposition to the urging force of the movable contact plate 16, about the center of pivot 0 or the lateral axial center of the head portion 52b of each front hook leg held between the upper wall portion 55c and the lower wall portion 55d of the corresponding front latch portion 55, so that the contact points 16a of the movable contact plate 16 are brought into contact with the contact points 17a of the boss plate 17 by means of the projections 13, whereby the horn is actuated.

As described above, the front hook legs 52 of the horn pad 11 are laterally spaced from each other, each head portion 52b includes the cylindrical portion extending laterally, and the head portion 52b of the front hook leg 52 is inserted in the space portion 51 of the front latch portion 55, so that the laterally-elongate head portion 52b is held between the upper wall portion 55c and the lower wall portion 55d, the vertical spacing between them being made substantially identical with the diameter of the head portion 52b.

Therefore, the horn pad 11 is prevented from inclining laterally because the head portion 52b of the front hook leg 52 is laterally elongated, and the front portion of the pad 11 is prevented from descending and ascending. As far as a point within the rear control portion P of the horn pad 11 is depressed, the steering wheel W3 inclines only longitudinally about the center of pivot 0 or the lateral axial center of the head portion 52d. Of course, the longitudinal inclination of the horn pad 11 is not hindered because the head portion 52b of the front hook leg 52 is elongated only laterally.

As described above, in the steering wheel W3 according to the third embodiment, the clearance between the horn pad 11 and the steering wheel body 14 including the surrounding lower cover 19, coating layer 18 and the like is easily determined in design while paying attention only to the longitudianal inclination of the horn pad 11, not to its lateral inclination; thus, the spacing between them can be remarkably lessened as compared with the conventional steering wheel W0 and the appearance of the steering wheel can be enhanced correspondingly.

Further, similarly to the first embodiment, the steering wheel W3 according to the third embodiment can operate with only one horn switch unit H in contrast with the conventional steering wheel W0; thus, the number of parts can be decreased and the number of assembling steps can be reduced.

Figure 19:
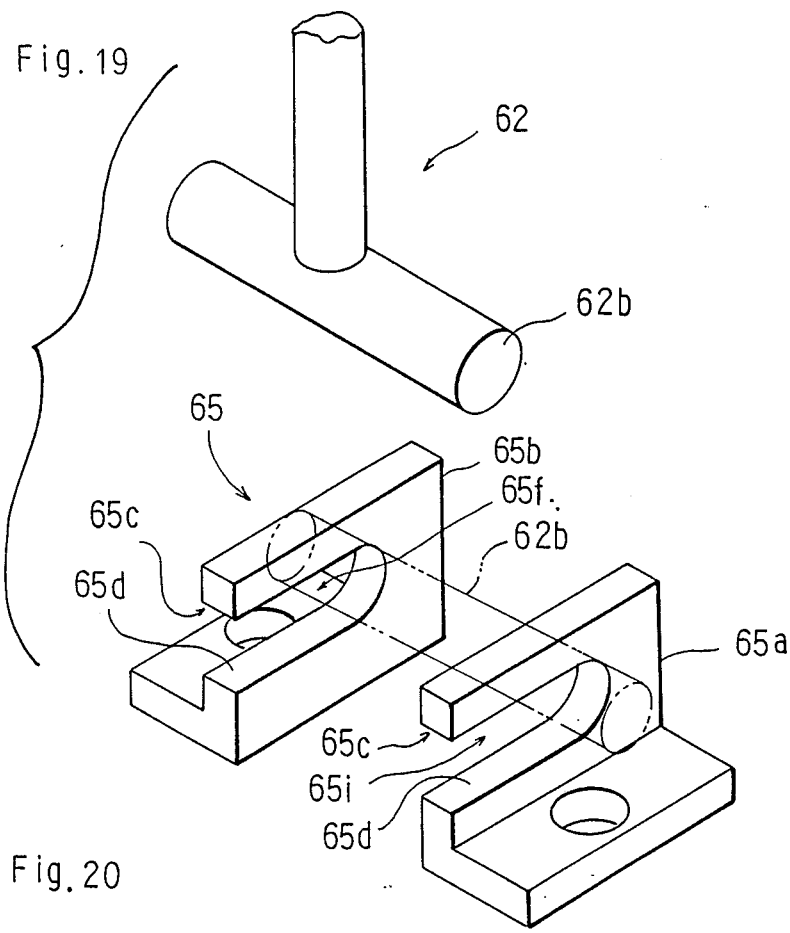
FIG. 19 is a perspective view showing a modification of a front latch portion according to the third embodiment.

Further, the steering wheel W3 according to the third embodiment includes the box-shaped front latch portions 55 in the steering wheel body 14. However, instead of the above, a front latch portion 65 as shown in FIG. 19 may be used in which each of left and right wall portions 65a, 65b has a longitudinally-extending cutout groove 65f, 65i serving as the space portion. In this front latch portion 65, the upper surface of the cutout groove 65f, 65i defines an upper wall portion 65c which restricts the upward movement of a head portion 62b of a front hook leg 62. The lower surface of the cutout groove defines a lower wall portion 65d. Thus, the head portion 62b of the front hook leg 62 is held between the upper wall portion 65c and the lower wall portion 65d, so that the horn pad inclines only longitudinally about the center of pivot 0 or the lateral axial center of the head portion 62b.

Figure 20:
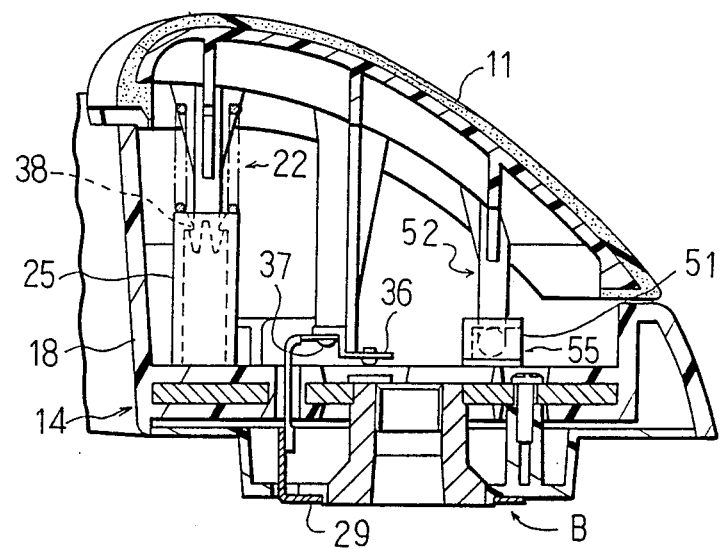
FIG. 20 is a sectional view showing a modification of the steering wheel according to the third embodiment.

Further, the steering wheel W3 according to the third embodiment includes the movable contact plate 16 in the horn switch unit H, which is made of a flat spring and serves also as the urging means. However, as shown in FIG. 20, where the movable contact plate 36 is secured to the pad 11 by the screw 37 or the like, similarly to the modification of the first embodiment, the coil spring 38 serving as the urging means may be interposed between the pad 11 and the steering wheel body 14.

What is claimed is:

1. A steering wheel comprising
a steering wheel body,
a horn pad disposed and held above a boss section of said steering wheel body,
a plurality of hook legs provided on the back side of said horn pad,
a plurality of latch portions provided on said steering wheel body correspondingly to said hook legs,
an urging means disposed between said horn pad and said steering wheel body for urging said horn pad upward,
a horn switch unit disposed between said horn pad and said steering wheel body for actuating a horn when said horn pad is depressed,
a control portion arranged in a rear section of said horn pad when said horn pad depressed, and
a center-of-pivot portion laterally provided in a front section of said horn pad which acts as the center of pivot when said horn pad is depressed.

2. A steering wheel according to claim 1, wherein
each of said hook legs has a shaft portion, an enlarged head portion provided at the distal end of the shaft portion, and a gap formed in the head portion and extending in the axial direction of the shaft portion so that the diameter of the head portion can be reduced;
each of said latch portions is cylindrical, whose inner diameter is tapered to define a narrow portion by which the upper side of the head portion of the hook leg can be locked;
among said plurality of hook legs and said plurality of latch portions provided in the front and rear sections of said horn pad, a plurality of front hook legs and a plurality of front latch portions are respectively laterally arranged in the front section of said horn pad;
the head portion of each front hook leg is laterally enlarged;
the shaft portion of each front hook leg has ribs which are held in lateral abutment on the upper end surface, at the center, of the front latch portion when the front hook leg is locked by the front latch portion; and
the contact areas between said ribs and the upper end surfaces of said front latch portions define said center-of-pivot portion.

3. A steering wheel according to claim 1, wherein
said urging means is composed of a plurality of band-shaped spring pieces, each being bent in a substantially L shape in cross section and having spring resiliency;
each of said spring pieces is held at one end by the back side of said horn pad and at the other end by said steering wheel body with an intermediate bent portion being located on the front side of said horn pad;
said spring pieces are laterally arranged in the front section of said horn pad; and
the bent portions of said spring pieces define said center-of-pivot portion.

4. A steering wheel according to claim 1, wherein
among said plurality of hook legs, each of the plurality of front hook legs provided in the front section of said horn pad has a shaft portion, and a head portion provided at the distal end of the shaft portion which includes a columnar portion extending laterally;
each of the plurality of front latch portions corresponding to said front hook legs has a space portion whose inner dimension is substantially identical with the diameter of the head portion of the front hook leg, and an upper wall for restricting the upward movement of the head portion when the head portion is disposed in the space portion;
among said plurality of hook legs, each of the plurality of rear hook legs provided in the rear section of said horn pad has a shaft portion, an enlarged head portion provided at the distal end of the shaft portion, and a gap formed in the head portion and extending in the axial direction of the shaft portion so that the diameter of the head portion can be reduced;
each of the plurality of rear latch portions corresponding to said rear hook legs is cylindrical, whose inner diameter is tapered to define a narrow portion by which the upper side of the head portion of the rear hook leg can be locked; and
the head portions of said front hook legs define said center-of-pivot portion.

* * * * *